United States Patent [19]

Harris et al.

[11] Patent Number: 4,528,203

[45] Date of Patent: Jul. 9, 1985

[54] PROCESS PREPARATION OF SOLUBLE PROTEIN AND USE

[75] Inventors: Peter Harris; Richard W. Yoell, both of Bedfordshire, England

[73] Assignee: Lever Brothers Company, New York, N.Y.

[21] Appl. No.: 632,698

[22] Filed: Jul. 23, 1984

Related U.S. Application Data

[63] Continuation of Ser. No. 403,588, Jul. 9, 1982.

[30] Foreign Application Priority Data

Nov. 25, 1980 [GB] United Kingdom ............... 8037701

[51] Int. Cl.³ .................... A21D 10/00; A23C 21/00
[52] U.S. Cl. .................................. 426/555; 426/491; 426/558; 426/583; 426/662; 260/112 R; 260/122
[58] Field of Search .............. 426/555, 583, 491, 662, 426/568, 558; 260/112 R, 122

[56] References Cited

U.S. PATENT DOCUMENTS

| 3,896,241 | 7/1975 | Malaspina | 426/491 |
| 3,922,375 | 11/1975 | Dalan | 426/491 |
| 4,089,987 | 5/1978 | Chang | 426/564 |
| 4,267,100 | 5/1981 | Chang | 426/564 |

FOREIGN PATENT DOCUMENTS 0756632  9/1956  United Kingdom ............... 426/653

Primary Examiner—Raymond Jones
Assistant Examiner—Elizabeth A. King
Attorney, Agent, or Firm—Milton L. Honig; James J. Farrell

[57] ABSTRACT

A novel soluble protein aggregate is described which may be prepared from whey by suitable methods of alkali treatment and concentration, particularly using ultrafiltration to remove selectively calcium phosphate and lactose. The product is readily heat-settable and suitable for replacing at least part of the egg ingredient in cake mixes.

15 Claims, No Drawings

PROCESS PREPARATION OF SOLUBLE PROTEIN AND USE

This is a continuation application of Ser. No. 403,588, filed July 9, 1982.

This invention relates to edible protein material which is suitable for replacement of at least part of the egg normally used in bakery products, especially cakes. The invention also relates to the preparation of such products.

The function of egg as an ingredient in cake recipes is very complex but clearly involves a physico-chemical contribution of its protein content to the structure of the cake. Further analysis suggests that in contrast to its performance in baking operations for example in meringues, in which its presence is required mainly to provide a high foam activity, the protein provided in other cases by egg ingredients in the recipe contributes a heat-setting property of major importance to successful cake-making.

While the replacement, even partially, of egg by alternative protein sources including whey protein has previously been proposed for cake-making, none has so far been entirely satisfactory. A variety of proteins is available in whey but the most important for heat-setting characteristics are alpha-lactalbumen and beta-lactoglobulin, together constituting about two-thirds of the total protein content of whey. The application even of moderate heating converts both to aggregated forms which are insoluble. The present invention is based on the discovery however that a protein product suitable for replacing at least part of the egg ingredient in baking products comprises a soluble form of aggregated edible, preferably whey protein having a molecular weight in excess of 100,000 which is substantially free from alpha-lactalbumen aggregate.

Fractions of soluble protein gel may be identified according to methods of filtration well understood in the art, using a column of adsorbent packing such as for example, beads of Sephadex or Ultragel, having pores of molecular dimensions. According to such methods the major protein fraction of whey comprises in increasing molecular weight, alpha-lactalbumen, beta-lactoglobulin and bovine serum albumen, with a minor fraction comprising proteo peptose and immunoglobulins. Using a column packed with Ultragel AcA 34, an acrylamide-agarose polymer marketed by L.K.B. Co. (Sweden), unprocessed milk is found to contain substantially no soluble aggregated whey proteins but upon heating e.g. to pasteurization temperatures, their presence can be indicated as the first, unadsorbed flushing from the column known as the void volume with an average molecular weight of the order of $10^5$. Since moreover the separation of whey from curds is usually incomplete in cheese-making processes, the void volume from separated whey can also contain a proportion of soluble casein protein aggregates. Both these and heat-aggregated soluble protein may be distinguished from the soluble aggregates of the invention by a standard method of protein disaggregation using reagents such as for example sodium dodecyl sulphate and urea and mercapto ethanol. By these methods also the presence of aggregated alpha-lactalbumen in the aggregates is detectable. While the products of the invention are free from aggregated alpha-lactalbumen, unaggregated alpha-lactalbumen may be present, as also may be a proportion of native whey protein left unaffected either due to incompleteness of the process reactions, or because a proportion is not susceptible to the reactions.

The products of the invention may be obtained by a combination of selective concentration of whey components and alkali treatment. Sweet or acid whey may be used. The concentration step should leave a solution of whey solids with substantially no tendency towards premature precipitation during the alkali treatment. To this end the selective removal of calcium phosphate in particular, constituting the principal components of the ash content of the whey, is desirable beforehand to avoid interference during the subsequent alkali treatment by colloidal formation which is very difficult thereafter to remove. It is also desirable to decrease the lactose:whey solids ratio during the concentration stage. This may be effected before the alkali treatment and/or afterwards. Preferably therefore an ash:protein weight ratio less than 1:5 is provided in the product of the invention by selective concentration before the alkali treatment. Optionally also a lactose:protein ratio less than 2:1 is present in the product. This may be provided by selective concentration before or after the alakli treatment. Protein concentration before the alkali treatment should preferably be kept below 20% preferably 5 to 15%. Amounts, ratios and percentages are all by weight.

Concentration is preferably effected at least in part by ultrafiltration, applied under pressure preferably of 2 to 25 kgs/cm$^2$ in contact with a semi-permeable membrane which is permeable to lactose and mineral salts. Sweet or acid whey may be used and the concentration is preferably carried out at a pH not more than 6 to liberate mineral salts from complex formation with the protein present and thus promote their passage through the membrane. A six-fold protein concentration may be effected, in conjunction if desired with intermediate water dilution to facilitate the further depletion of permeate solute and the resulting whey concentrate may for example contain from 10 to 40% solids. Further concentration may be provided at least in part also by ultrafiltration, following the alkali treatment step of the process according to the invention.

The alkali treatment of the whey cocentrate should preferably be carried out using an alkali solution of not more than 0.5% concentration to minimize the formation of protein degradation products such as lysinoalanine. The pH of the alkali-treated concentrate should preferably be at least 9.5 but insufficient to induce protein degradation, preferably less than 11.5. This period of high pH values is maintained preferably for between 5 and 30 minutes, particularly in the region of 15 minutes and at a temperature between 20° and 50° C., preferably 20° to 30° C. It is then followed by a pH change to a value not more than 8.0, but preferably at least 6.5. Any protein that may precipitate at lower pH should be redissolved by small increase in pH.

The products of the present invention may be provided as an aqueous concentrate. Preferably however further concentration is effected after the alkali treatment step, to recover a solid in powder form. Preferably the further concentration includes another ultrafiltration step, under similar conditions as before and providing selctive removal of lactose and mineral salts, including in particular sodium salts formed during the alkali treatment step, in the course of which acid may be added to increase the pH to a lower degree of alkalinity. Preferably the solids content is raised to 50 to 60 weight % protein by ultrafiltration, the concentrate then containing 5 to 6% protein.

Preferably the concentrate after ultrafiltration at this stage is pasteurised by heat treatment, for example at 75° C., before more water is removed for example by multiple effective apparatus or falling film evaporators. Finally the residual aqueous composition is spray-dried.

The invention provides a readily heat-settable protein product readily usable in a variety of food products.

In particular, cake mixes may include 2 to 10% of the product by weight of dry ingredients, which may also include for example 25 to 40% of flour, sugar within the same range and up to 30% fat, in addition to other conventional ingredients such as emulsifiers, baking powder and milk powder. Higher amounts may be used for example in choux pastry mixes; e.g. approximately 20%.

EXAMPLE

Sweet whey obtained from cheese preparation and with a pH of approximately 6.0 was analysed to the following composition:

| Component | Weight % | Weight % dry basis |
| --- | --- | --- |
| Protein | 0.6 | 10.2 |
| Ash* | 0.3 | 5.1 |
| Fat | 0.5 | 8.5 |
| Lactose | 4.5 | 76.3 |
| Water | 94.1 | |

*Substantially $Ca_3(PO_4)_2$

Insoluble matter and most of the fat was removed by centrifugation. The solids content of the resulting clarified whey was increased to approximately 10 weight % from 6 weight % by ultrafiltration at 28° to 30° C. at the same pH and 4 kg per cm² pressure through a Rhone-Poulenc membrane with a nominal molecular weight cut-off $10^4$, until a 4-times volume concentration was achieved. The solids content of the retentate then comprised by weight 36% protein, 5.7% ash, 0.5% calcium and 55% lactose.

A 0.5% aqueous sodium hydroxide solution was metered into a stream of the whey concentrate admitted into a holding tank at a sufficient rate to maintain the tank contents at pH 10.5 to 11.5. After 15 minutes at 28° to 30° C. the pH was reduced in a similar fashion to 8.0 using 2% hydrochloric acid solution before further concentration by ultrafiltration and the same conditions as before, to a protein content of at least approximately 60 weight % dry matter basis. The residue was then pasteurised at 55° to 75° C. for 5 to 45 minutes, until TVC (Total Viable Count) is not more than $10^4$, before admission to a falling film evaporator providing an increased solids level to 25 to 30 weight % at reduced pressure, the concentrate being finally spray-dried at inlet temperature 160° C., outlet 60° C.

On analysis the spray-dired powdered product contained beta-lactoglobulin in a soluble, aggregated form having a molecular weight of over $4 \times 10^5$ and substantially free from alpha-lactalbumen aggregate.

Madeira cake was prepared according to a standard recipe, modified in the preparation of a test sample by replacing half the egg ingredient by the product prepared according to the invention as described. The solids content of the test recipe was supplemented by an equal amount of added defatted soya and wheat flour or other egg yolk substitute used in cakes, e.g. a mixture of fat, lecithin, whey protein and maltodextrin. The test cake was compared with a control made using the standard recipe which was as follows:

| Group | Ingredients | | % | |
| --- | --- | --- | --- | --- |
| I | Cake flour | | 13.15 | |
| | Margarine | | 6.5 | |
| | Shortening | | 6.5 | |
| | Caster sugar | | 21.85 | |
| | Salt | | 0.5 | |
| | Glycerol | | 0.8 | |
| | | | Control | Test |
| II | Whole egg | | 16.4 | 8.2 |
| | Test product | | — | 1.05 |
| | Defatted soya flour + wheat flour | | — | 1.05 |
| | Water | | — | 6.1 |
| III | Milk | | 16.4 | |
| IV | Cake flour | | 16.7 | |
| | Baking powder | | 1.2 | |

The recipe was as follows:

The fat and the sifted dry ingredients of Group I were blended to a paste for two minutes on a Hobart mixer fitted with a beater and 10-quart bowl and was set on the slow speed. Group II ingredients were mixed together and added in a continuous stream for two minutes at slow speed. The mixer was creamed for eight minutes with the machine set at the second speed and scraped down.

Half the milk was similarly added at slow speed, followed by the flour and baking powder, previously sifted together and the remainder of the milk added similarly.

After scraping down 450 gms were weighed out into each of 6" hoop tins and baked at 190° C. for 55 minutes.

In appearance, taste, texture and mouth-feel the test cake compared favourably to the control cake. Batter and cake specific volumes were closely similar, 1.43/1.44 and 2.64/2.67 respectively for the control and test in each case.

Overall a significant preference for the test cake was expressed.

In a comparative test a panel of eight persons tasted Madeira cake samples made by conventional recipe in which one-third of the egg ingredient was replaced by a whey protein-based egg substitute, one being that of the present invention and the other a commercially-available product containing approximately equal parts of alpha-lactalbumen and beta-lactoglobulin.

The panel unanimously declared that the commercially available product conferred inferior taste and texture to the cake in comparison with the product of the invention.

The performance in cake mixtures of the whey products of the invention as egg substitute may be further enhanced by admixture with a phospholipid, the role of which is akin to that of egg yolk. Phospholipids are available commercially as dispersions in edible oil. These are preferably pre-adsorbed on a suitable carrier before admixture. For this purpose, pregelatinized starch is preferred, particularly of the kind known as Ceragel, but other farinaceous sources are suitable.

A preferred phospholipid dispersion in oil is Cetinol, but other sources of the phosphatidyl cholinerich fraction of phosphatides may be used, particularly in a concentration of from 20 to 50% in an oil dispersion which is itself preferably dispersed in an amount on the carrier providing a concentration of 5 to 20% phospholipid based on the total composition of carrier and phospholipid dispersion. Preferably the oil dispersion is adsorbed in a ratio from 1:2 to 3:2, preferably approximately 2:3, providing in the mixture an amount of the phospholipid from 20 to 40% of the whey protein.

We claim:

1. Process for the preparation of soluble protein by alkali treatment and concentration through ultra-filtration of whey, comprising the steps of:
   (a) removing calcium phosphate from whey by adjusting the pH to a value not more than 6 at which calcium phoshate is rendered selectively separable by ultra-filtration from whey protein;
   (b) selectively removing calcium phosphate in a permeate by ultra-filtration from a retentate comprising demineralized whey;
   (c) subjecting the whey retentate to alkali treatment at a pH from 9.5 to 11.5 at which beta-lactoglobulin present selectively forms soluble aggregate having a molecular weight in excess of 100,000;
   (d) decreasing the pH to within the range from 6.5 to 8; and
   (e) concentrating the solution of soluble protein by ultra-filtration at any stage subsequent to said step b.

2. Process according to claim 1 wherein the concentration of protein during alkali treatment is below 20%.

3. Process according to claim 1 wherein the concentration of protein during alkali treatment is between 5 and 15%.

4. Process according to claim 1 wherein a sixfold protein concentration is effected to provide a solids content from 10 to 40% for alkali treatment.

5. Process according to claim 1 wherein the alkali treatment is carried out using an alkali solution of not more than 0.5% concentration.

6. Process according to claim 1 wherein the alkali treatment is limited to a period between 5 to 30 minutes.

7. Process according to claim 1 wherein the alkali treatment is maintained at a temperature between 20° and 50° C.

8. Process according to claim 1 wherein the solids content of the treated whey is raised to 50 to 60% protein by ultrafiltration.

9. Process according to claim 1 wherein the treated whey is heatpasteurised.

10. Soluble protein products obtained by the process as claimed in claim 1.

11. Cake mix comprising fat, flour, egg and other cake ingredients wherein at least part of the egg ingredient is an egg substitute comprising a soluble whey protein product as claimed in claim 10.

12. Cake mix according to claim 11 which includes from 5 to 10% of phospholipid.

13. Cake mix according to claim 12 in which the phosholipid is adsorbed in an edible oil dispersion on pregelatinized starch.

14. Cake mix according to claim 12 or 13 in which the phospholipid comprises phosphatidyl choline.

15. An egg substitute comprising a soluble protein prouct as claimed in claim 10 in admixture with a dispersion of a phospholipid.

* * * * *